US010082410B2

(12) United States Patent
Saendig

(10) Patent No.: US 10,082,410 B2
(45) Date of Patent: Sep. 25, 2018

(54) OPTICAL POSITION MEASURING DEVICE FOR GENERATING WAVELENGTH-DEPENDENT SCANNING SIGNALS

(71) Applicant: DR. JOHANNES HEIDENHAIN GmbH, Traunreut (DE)

(72) Inventor: Karsten Saendig, Palling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 197 days.

(21) Appl. No.: 14/870,158

(22) Filed: Sep. 30, 2015

(65) Prior Publication Data

US 2016/0109216 A1  Apr. 21, 2016

(30) Foreign Application Priority Data

Oct. 21, 2014 (DE) .................. 10 2014 221 340

(51) Int. Cl.
*G01D 5/347* (2006.01)
*G01B 11/00* (2006.01)
*G01B 9/02* (2006.01)

(52) U.S. Cl.
CPC ..... *G01D 5/34746* (2013.01); *G01B 9/02097* (2013.01); *G01B 11/00* (2013.01); *G01B 11/002* (2013.01)

(58) Field of Classification Search
CPC ........... G01D 5/34707; G01D 5/34746; G01D 5/266; G01B 11/14
See application file for complete search history.

(56) References Cited

U.S. PATENT DOCUMENTS

| 5,621,527 A * | 4/1997 | Kaneda | G01D 5/38 250/237 G |
|---|---|---|---|
| 5,678,319 A * | 10/1997 | Huber | G01D 5/38 33/707 |
| 7,019,842 B2 * | 3/2006 | Holzapfel | G01D 5/34715 356/499 |

(Continued)

FOREIGN PATENT DOCUMENTS

| DE | 102007024349 A1 | 11/2008 |
|---|---|---|
| EP | 2765394 A2 | 8/2014 |

*Primary Examiner* — Michael P Lapage
(74) *Attorney, Agent, or Firm* — Leydig, Voit & Mayer, Ltd.

(57) ABSTRACT

An optical position-measuring device includes a scanning unit and a material measure that is movable relative thereto in a measuring direction. The scanning unit includes a splitting device and an optoelectronic detector arrangement. The splitting device is configured to separate sub-beams incident thereon as a function of wavelength. The splitting device is configured as an asymmetrical interferometer that includes two interferometer arms having different optical path lengths, within which the sub-beams propagate between splitting and recombination until the recombined sub-beams arrive at the detector arrangement. The optical position-measuring device is configured to generate a plurality of phase-shifted scanning signals indicative of a relative position of the scanning unit and of the material measure, wherein phase relations of the generated phase-shifted scanning signals are wavelength-dependent.

15 Claims, 3 Drawing Sheets

(56) References Cited

U.S. PATENT DOCUMENTS

| | | | |
|---|---|---|---|
| 2004/0174536 A1* | 9/2004 | Jourlin | G01D 5/38 356/521 |
| 2008/0297809 A1 | 12/2008 | Holzapfel et al. | |
| 2011/0192964 A1* | 8/2011 | Makinouchi | G01D 5/34746 250/231.1 |
| 2011/0272565 A1* | 11/2011 | Makinouchi | G01D 5/34746 250/231.1 |
| 2013/0001412 A1* | 1/2013 | Tobiason | G01D 5/38 250/231.1 |
| 2013/0114087 A1* | 5/2013 | Deck | G01B 9/0209 356/486 |
| 2013/0277540 A1* | 10/2013 | Tobiason | G01D 5/268 250/227.11 |
| 2014/0049762 A1* | 2/2014 | Goodwin | G01B 11/14 355/72 |
| 2014/0183345 A1* | 7/2014 | Goodwin | G01D 5/34 250/231.1 |
| 2014/0218746 A1 | 8/2014 | Saendig | |

* cited by examiner

OPTICAL POSITION MEASURING DEVICE FOR GENERATING WAVELENGTH-DEPENDENT SCANNING SIGNALS

CROSS REFERENCE TO PRIOR APPLICATION

Priority is claimed to German Patent Application No. DE 10 2014 221 340.1, filed on Oct. 21, 2014, the entire disclosure of which is hereby incorporated by reference herein.

FIELD

The present invention relates to an optical position-measuring device that is suited for highly accurately determining the relative position of two objects that are movable relative to one another.

BACKGROUND

An optical position-measuring device of the species for generating displacement-dependent, phase-shifted scanning signals is known from the European Patent Application EP 2 765 394 A2. It includes a scanning unit having a fiber-optic scanning head, as well as a material measure that is movable relative thereto in at least one measuring direction. The fiber-optic scanning head is connected to an optical fiber, upstream of whose material measure-side end thereof, a scanning reticle is disposed. Provided at the end of the optical fiber facing away from the material measure side is a light source, as well as a detector device having a detector arrangement. The material measure is broadband-illuminated, respectively scanned by the light source, so that, for a specific wavelength, sinusoidal scanning signals result in response to a relative movement of the material measure and the scanning unit. Thus, what is commonly known as an encoding of scanning signals as a function of wavelength is performed here, i.e., the phase relations of the generated phase-shifted scanning signals are wavelength-dependent. On the detection side, the detected light must then be split into the spectral components thereof in order to generate the phase-shifted electrical scanning signals required for further processing. To this end, the detector device has splitting means for separating the sub-beams incident thereon as a function of wavelength, the splitting means including a diffraction grating. Thus, in the known device from the European Patent Application EP 2 765 394 A2, the required wavelength-dependent splitting of the detected light is carried out spectrometrically.

In this type of optical position-measuring device, the displacement of the phase relation of the scanning signals as a function of the wavelength variation constitutes an essential design parameter. The displacement is to be dimensioned to be at least large enough to make it possible to obtain three scanning signals, which are each phase-shifted by 120° (or, in some instances, four by 90°), within the available spectrum of the illuminating light. Thus, for example, if a 30 nm wide spectrum is available on the illumination side, the dispersion of the position-measuring device is then to be selected in a way that allows a wavelength variation of 10 nm to produce a phase shift of 120°. On the other hand, this means that the splitting means provided must ensure a resolution of 10 nm.

In the known device from the European Patent Application EP 2 765 394 A2, the beams, which are sent back via the optical fibers to the detector device, are first collimated by a collimator lens disposed between the optical fiber and the detector device. To ensure that sufficient optical power, for example from a LED light source, can be transmitted through an optical fiber, it is necessary that the optical fiber have a large enough numerical aperture and a large enough core diameter. Due to the finite size of the core diameter, the beam has a specific divergence following the collimation. This beam is to be subsequently split by the splitting means, which is designed as a diffraction grating, at different deflection angles into the spectral components thereof. However, different spectral components are then resolved by the diffraction grating only when the difference in the deflection angles is greater than the divergence of the beam to be deflected. Thus, a small enough divergence is needed to achieve the requisite resolving capability. To this end, the collimator lens provided between the optical fiber and the detector device must have a long enough focal length. The result is a correspondingly large diameter of the collimator lens, if no light is to be lost during the detection process. Thus, the required spectroscopic resolving capability of the detector device substantially determines the detection-side size of the position-measuring device that is provided.

SUMMARY

In an embodiment, the present invention provides an optical position-measuring device including a scanning unit and a material measure that is movable relative to the scanning unit in at least one measuring direction. The scanning unit includes a splitting device and an optoelectronic detector arrangement. The splitting device is configured to separate sub-beams incident thereon as a function of wavelength. The splitting device is configured as an asymmetrical interferometer that includes two interferometer arms having different optical path lengths, within which the sub-beams propagate between splitting and recombination until the recombined sub-beams arrive at the detector arrangement. The optical position-measuring device is configured to generate a plurality of phase-shifted scanning signals indicative of a relative position of the scanning unit and of the material measure, wherein phase relations of the generated phase-shifted scanning signals are wavelength-dependent.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
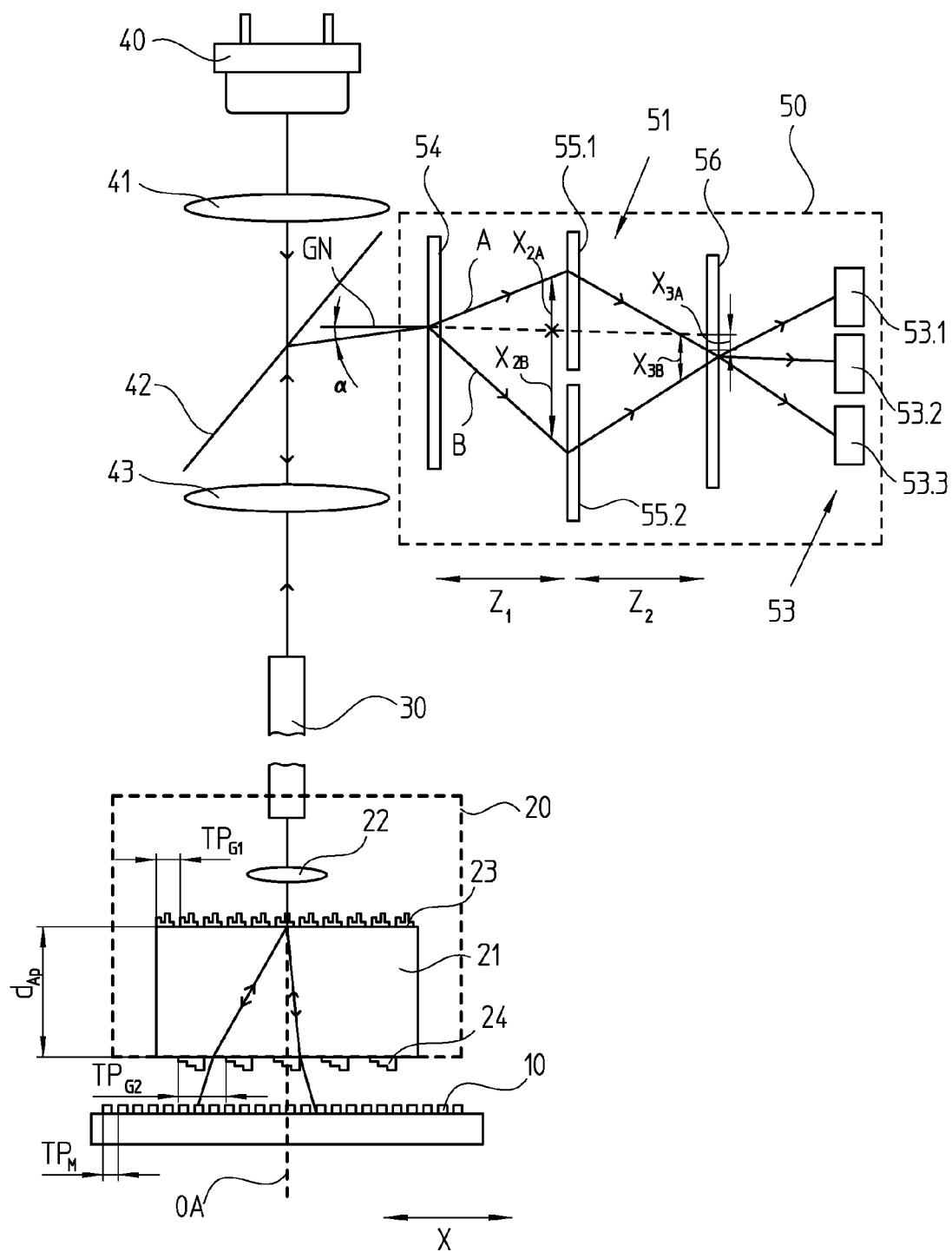
FIG. 1 is a schematized view of a first exemplary embodiment of the optical position-measuring device according to the present invention.

In an embodiment, the present invention provides an optical position-measuring device of the type mentioned at the outset which, in spite of a high spectroscopic resolution on the detection side, may have a compact design.

The optical position-measuring device according to an embodiment of the present invention is used for generating a plurality of phase-shifted scanning signals indicative of the relative position of a scanning unit and of a material measure that is movable relative thereto in at least one measuring direction. The phase relations of the generated phase-shifted scanning signals are wavelength-dependent; the scanning unit includes a splitting device for separating the sub-beams incident thereon as a function of wavelength, as well as an optoelectronic detector arrangement. The splitting device is designed as an asymmetrical interferometer that includes two interferometer arms having different optical path lengths, within which the sub-beams propagate between splitting and recombination until the recombined sub-beams arrive at the detector arrangement.

The optical path lengths in the two interferometer arms are preferably selected to allow the same phase shifts to result per wavelength variation on the detection side and the scanning side.

The asymmetrical interferometer may be configured as a grating interferometer and include a splitting grating, as well as at least one downstream deflection grating; at the splitting grating, the incident sub-beams being split between the two interferometer arms; the sub-beams then propagating in the direction of the at least one deflection grating that re-deflects the sub-beams to arrive at a superposition location for the recombination thereof.

In this context, the splitting grating may be designed as a blazed grating or as a two-stage, deeply etched grating and cause the sub-beams incident thereon to be split into different diffraction orders.

The splitting grating advantageously has two different grating constants, for each of which diffraction orders having a high diffraction efficiency result.

It is also possible that the grating interferometer include one or a plurality of deflection gratings having at least two different grating constants, and that the two interferometer arms be associated with different deflection grating regions on the deflection gratings having different grating constants.

Disposed in this context at the superposition location is a combining grating, downstream of which there are a plurality of detector elements of the detector arrangement for recording the phase-shifted scanning signals.

Furthermore, a structured detector of the detector arrangement may be disposed at the superposition location, the structured detector being composed of a multiplicity of periodically arrayed detector elements via which the phase-shifted scanning signals are recorded.

It is advantageously provided that:
the sub-beams be perpendicularly incident to the splitting grating; and that
the grating interferometer include at least one deflection grating that is designed as a binary grating which
in response to an illumination at the Littrow angle, provides a diffraction efficiency of >70% in +/−$1^{st}$ diffraction order; and that
in response to a perpendicular illumination, provides a diffraction efficiency of >70% in $0^{th}$ diffraction order.

It may also be provided that:
the sub-beams be incident to the splitting grating at an angle that deviates from 90°, the angle being selected to allow one of the +/−$1^{st}$ diffraction orders resulting at the splitting grating to continue to propagate perpendicularly to the splitting grating; and that
the splitting grating be configured as a two-stage, deeply etched grating that suppresses the $0^{th}$ diffraction order.

Alternatively, the asymmetrical interferometer may also be designed as a mirror interferometer and include a splitting grating, as well as a plurality of downstream deflection mirrors; at the splitting grating, the sub-beams incident thereon being split between the two interferometer arms; the sub-beams then propagating in the direction of the deflection mirrors that re-deflect the sub-beams to arrive at a superposition location for the recombination thereof.

To thereby adjust a desired optical path difference in at least one of the interferometer arms, a plane-parallel glass plate of a defined thickness may be disposed in the optical path of a sub-beam.

Advantageously disposed at the superposition location is a structured detector of the detector arrangement, the structured detector being composed of a multiplicity of periodically arrayed detector elements via which the phase-shifted scanning signals are recorded, the beam path in the two interferometer arms and/or the orientation of the structured detector being selected to allow a normal to the structured detector to constitute the bisectrix between the two sub-beams that are incident thereon.

The scanning unit may also include a fiber-optic scanning head, a scanning reticle being disposed in the fiber-optic scanning head upstream of the material measure-side end of an optical fiber, and the splitting device, the detector arrangement and at least one light source being disposed at the end of the optical fiber facing away from the material measure.

The optical position-measuring device according to embodiments of the present invention proves to be especially advantageous in that it may have a very compact construction on the detection side due to the alternative design of the splitting device. This is possible since lenses having a short focal length may be used for the requisite collimation.

A first exemplary embodiment of the optical position-measuring device according to the present invention will be described below with reference to FIG. 1. It has a material measure 10 and a scanning unit, material measure 10 being designed as a linear reflection material measure and being configured to be movable at least in indicated measuring direction x relative to scanning unit 20 having a fiber-optic scanning head. In this connection, either reflection material measure 10 may be configured to be stationary and scanning unit 20 movable, or reflection material measure 10 may be disposed to be movable and scanning unit 20 stationary. Reflection material measure 10 and scanning unit 20 are connected to two objects, which are movable relative to one another in measuring direction x and whose position relative to each other is to be determined These objects may be movable components of a machine, for instance, which are movable relative to one another and whose relative position must be recorded. These components may then be properly position feedback controlled or positionally controlled by a subsequent electronics to which the position-dependent scanning signals generated by the position-measuring device are fed.

In the illustrated exemplary embodiment, material measure 10 is designed as a linear reflection phase grating having grating constant $TP_M$, which is scanned under the incident light from the fiber-optic scanning head of scanning unit 20. Material measure 10 is composed of graduation regions which are periodically arrayed in measuring direction x and have different phase-shifting effects. The graduation regions are rectangular in shape, the longitudinal axis of the rectangle extending in each instance along a direction that is oriented orthogonally to measuring direction x in the material measure plane.

Alternatively to the described specific embodiment, it is self-evident that a rotary material measure in the form of a radial or cylindrical graduation in the position-measuring device according to the present invention may also be used; it is likewise conceivable for an amplitude grating to be used at this location.

Material measure 10 is illuminated by the feeding of an illuminating light beam via an optical fiber 30. For this purpose, at the end of optical fiber 30 facing away from the material measure, a spectrally broadband light source 40 is disposed, whose radiation is coupled via incoupling means in the form of a collimator lens 41, a beam splitter 42, and an incoupling lens 43, into optical fiber 30. An infrared LED, which emits at a central wavelength of 850 nm and has a spectral width of 60 nm, for example, is possible as a suitable light source 40 having a sufficiently broadband emission spectrum.

Besides light source 40, also provided at the end of optical fiber 30 facing away from the material measure is a detection unit 50, via which a plurality of phase-shifted scanning signals are generated from the superimposed sub-beams received. The sub-beams, which are reflected back from reflection material measure 10 and are superimposed, are fed via optical fiber 30 and beam splitter 42 to detection unit 50; for more details on the design and principle of operation of detection unit 50, reference is made to the following description. The displacement-dependent scanning signals are fed from detection unit 50 to subsequent electronics that uses them for position feedback control or positioning control of the objects that are movable relative to one another.

Accordingly, the various active components of the position-measuring device according to the present invention, such as, in particular, light source 40 and detection unit 50, are disposed at a distance from the actual measurement location and optically coupled thereto merely by optical fiber 30. On the one hand, interference effects on these components are minimized in this way; on the other hand, scanning head 20, together with the passive fiber-optic scanning head at the measurement location, may have a very compact design.

Optical fiber 30 is preferably designed as a multi-mode fiber. Via this fiber, the beam used for illumination may be transmitted toward material measure 10, as well as superimposed sub-beams used for detection may be transmitted away from reflection material measure 10, toward detection unit 50.

The following clarifies the generation of wavelength-dependent, encoded phase-shifted scanning signals in the first exemplary embodiment; this generation corresponds to that already known from the European Patent Application EP 2 765 394 A2, which is expressly referred to in this context. It should be noted that the exemplarily explained generation of wavelength-dependent, encoded, phase-shifted scanning signals is not essential to the present invention. This may take place in some other way. Reference is made in this regard to the German Patent Application DE 10 2007 024 349 A1 of the Applicant.

As is readily apparent from FIG. 1, the fiber-optic scanning head of scanning unit 20 in the present exemplary embodiment includes a scanning reticle 21, which is disposed upstream of the end of optical fiber 30 on the material measure side, as well as a refractive optical element in the form of a lens 22. In this case, lens 22 is disposed in the fiber-optic scanning head between optical fiber 30 and scanning reticle 21. Via lens 22, the incident beam from the exit face of the optical fiber is collimated on the way thereof toward material measure 10 along optical axis OA, respectively sub-beams incident thereon from the direction of material measure 10 are coupled again into optical fiber 30, respectively focused onto the entrance face of the optical fiber.

As scanning reticle 21, a transparent carrier substrate of glass having a thickness $d_{AP1}$ is used, on whose side (top side) facing optical fiber 30, a first transmission grating 23 having grating constant $TP_{G1}$ is disposed, and on the side (bottom side) facing material measure 10, a second transmission grating 24 having grating constant $TP_{G2}$ is disposed. Via first transmission grating 23, the beam incident thereon that is collimated by lens 22, is split into at least two diffracted sub-beams which, once split, propagate further in scanning reticle 21 asymmetrically to a normal to the scanning reticle; in the present exemplary embodiment, optical axis OA sketched in FIG. 1 constitutes such a normal to the scanning reticle. First transmission grating 23 is configured as a blazed phase grating having a maximum diffraction efficiency in the $+1^{st}$ and $-2^{nd}$ diffraction orders. Thus, these two diffraction orders produce the sub-beams that continue to propagate asymmetrically in the scanning beam path and are used to generate the displacement-dependent scanning signals and that travel different optical path lengths between splitting and recombination.

After passing through scanning reticle 21, the split sub-beams reach second transmission grating 24, which is located on the side of scanning reticle 21 that faces reflection material measure 10. Second transmission grating 24 causes the sub-beams incident thereon to be deflected from first transmission grating 23 in such a way that, following passage through second transmission grating 24, they then continue to propagate symmetrically to a normal to the scanning reticle between scanning reticle 21 and reflection material measure 10. Moreover, second transmission grating 24 deflects the sub-beams in a way that causes them to be incident to material measure 10 in what is generally referred to as the Littrow angle. A Littrow angle incidence of the sub-beams to material measure 10, which is designed to be reflecting in this exemplary embodiment, has the effect of reflecting back these sub-beams by material measure 10 to scanning reticle 21 at the same angle at which they are incident to scanning reticle 21. Second transmission grating 24 is likewise designed as a blazed phase grating; this phase grating is optimized to a maximum diffraction efficiency in the $+1^{st}$ and $-1^{st}$ diffraction orders.

Once the sub-beams are reflected back by material measure 10, they pass again through second transmission grating 24 on the bottom side of scanning reticle 21 and propagate in scanning reticle 21, again asymmetrically to a normal to the scanning reticle, until they are recombined at first transmission grating 23. At first transmission grating 23 on the top side of scanning reticle 21, the sub-beams, which are split at this transmission grating into $+1^{st}$ and $-2^{nd}$ diffraction orders, are brought into interfering superposition. The superimposed pair of sub-beams then finally propagates along optical axis OA toward lens 22 and is coupled by the same into optical fiber 30.

As already mentioned above, a wavelength-dependent encoding of the phase-shifted scanning signals is provided in the optical position-measuring device according to the present invention. This means that the phase-shifted scanning signals are generated from components of the illumination spectrum having different wavelengths. Decisive here is the asymmetrical beam path of the signal-generating sub-beams between the splitting and recombination at the first transmission grating and the resulting different optical path lengths that the sub-beams travel between the splitting and recombination. Accordingly, the asymmetrical beam path in this portion of the optical path causes a wavelength-dependent phase shift between the split sub-beams.

With regard to further details pertaining to this variant for generating wavelength-encoded, phase-shifted scanning signals, reference is expressly made to the European Patent Application EP 2 765 394 A2.

Important to the present invention at this point is a detection of the wavelength-encoded, phase-shifted scanning signals that is provided alternatively to the European Patent Application EP 2 765 394 A2, and the corresponding design of detection unit 50 used for this purpose.

In principle, detection unit 50, which is disposed at the end of optical fiber 30 facing away from the material measure, includes splitting device 51 for the wavelength-dependent separation of the superimposed sub-beams which are transmitted through optical fiber 30 toward detection device 50. In contrast to the European Patent Application EP 2 765 394 A2, the present invention provides that splitting device 51 (designated by reference numerals 151, 251 and 351 in FIGS. 2-4 respectively) be designed as an asymmetrical interferometer that features two interferometer arms A,B having different optical path lengths, in which the sub-beams propagate between splitting and recombination until the recombined sub-beams arrive at detector arrangement 53 (designated by reference numerals 153, 253 and 353 in FIGS. 2-4 respectively). In this context, the optical path lengths, respectively path differences in the two interferometer arms A, B are preferably selected to result in the same phase shifts per wavelength variation on the detection side and the scanning side.

In the present first exemplary embodiment of the optical position-measuring device according to the present invention, the asymmetrical interferometer provided on the detection side is configured here as a grating interferometer whose design and principle of operation are clarified in detail in the following.

There are further components for signal processing, which, in some instances, may be additionally disposed in detection unit 50 such as, for example, amplifier components, A/D converters, etc., for further electronic processing and conditioning of the scanning signals before they are transmitted to subsequent electronics for further processing.

In detection unit 50, the beam that is incident thereon, respectively the pair of re-superimposed sub-beams strikes a splitting grating 54 by an angle of incidence a to grating normal GN. This splitting grating 54 splits the incident sub-beams into two interferometer arms A, B, respectively into two different diffraction orders. Splitting grating 54 is preferably designed as a blazed grating having grating constants $d_{1A}$ and $d_{1B}$, and is optimized to a high diffraction efficiency of two diffraction orders.

Alternatively to the blazed grating, it may also be provided in the context of the present invention for the splitting grating to be designed as a two-stage, deeply etched grating that causes the sub-beams incident thereon to be split into different diffraction orders, respectively interferometer arms A, B.

Disposed in the beam propagation direction, at a distance $z_1$ from splitting grating 54, is at least one further grating in the form of a deflection grating, in whose direction, the sub-beams propagate in the two interferometer arms A, B, following the splitting. In the illustrated exemplary embodiment of FIG. 1, the deflection grating has a two-part design and includes two individual deflection gratings 55.1, 55.2 having different grating constants $d_{2A}$, $d_{2B}$. Thus, different deflection grating regions having different grating constants $d_{2A}$, $d_{2B}$ are associated with the two interferometer arms A, B, respectively with the sub-beams propagating therein; for instance, in interferometer arm A; deflection grating 55.1 having grating constant $d_{2A}$ is associated with the sub-beam propagating therein; in the other interferometer arm B, deflection grating 55.2 having grating constant $d_{2B}$ is provided. This is possible in the present case since distance $z_1$ is selected to be large enough and, in the mounting plane of the two deflection gratings 55.1, 55.2, the split sub-beams are spatially separate from one another.

If distance $z_1$ were selected to be smaller, so that there would be no complete separation of the beams in the mounting plane of the at least one deflection grating, it would be alternatively necessary to provide one single deflection grating that would have to be optimized for two diffraction orders. It would then be necessary for the corresponding deflection grating to feature, respectively include the two grating constants $d_{2A}$, $d_{2B}$.

As is readily apparent from FIG. 1, the result is that the two sub-beams are deflected back toward the optical axis via the two deflection gratings 55.1, 55.2 having different grating constants $d_{2A}$, $d_{2B}$. In the beam propagation direction, at a distance $z_2$ from the two deflection gratings 55.1, 55.2, the two sub-beams then overlap again, respectively recombine at a superposition location. In the illustrated exemplary embodiment, a combining grating 56, which has a grating constant of $d_3$, is configured in the corresponding plane. Disposed downstream of combining grating 56 are a plurality of detector elements 53.1-53.3 of optoelectronic detector arrangement 53.

In the following equations for characterizing various important system parameters in detection unit 50, analogously to the description in the European Patent Application EP 2 765 394 A2, instead of grating constants d, of various gratings 54, 55.1, 55.2, 56 in the beam path of detection unit 50, in each case, the reciprocal values thereof, thus k-vectors $k_i$ are used that may assume both positive, as well as negative values as a function of direction. Accordingly, splitting grating 54 has k-vectors $k_{1A}$, $k_{1B}$; deflection gratings 55.1, 55.2 have k-vectors $k_{2A}$, $k_{2B}$; combining grating 56 has k-vector $k_3$.

Grating constant $d_3$ of combining grating 56 is preferably to be thereby selected in a way that allows the $+1^{st}$ diffraction order of the one sub-beam incident thereon, respectively of the one interference arm to be in the same direction as the $+1^{st}$ diffraction order of the other sub-beam, respectively interference arm. From this is derived in the k vector representation for k vector $k_3$ of combining grating 56:

$$k_3 = \frac{1}{2}(k_{1B} + k_{2B} - k_{1A} - k_{2A}) \quad \text{(Equation 1)}$$

where:
$k_3 := 1/d_3$ (k vector of the combining grating)
$k_{1B} := 1/d_{1B}$ (k vector of the splitting grating for interference arm B)
$k_{2B} := 1/d_{2B}$ (k vector of the deflection grating for interference arm B)

$k_{1A}:=1/d_{1A}$ (k vector of the splitting grating for interference arm A)

$k_{2A}:=1/d_{2A}$ (k vector of the deflection grating for interference arm A)

Points of incidence $x_{2A}$, respectively $x_{2B}$ of the particular principal rays of the split sub-beams at deflection gratings 55.1, 55.2, respectively the distances thereof from an optical axis through detection unit 50 in interference arms A, B are derived as follows:

$$x_{2A/B} = z1 \frac{(\sin\alpha + \lambda k_{1A/B})}{n_{ref1}\sqrt{1-((\sin\alpha + \lambda k_{1A/B})/n_{ref1})^2}} \quad \text{(Equation 2)}$$

where $x_{2A}:=$the distance of the point of incidence of the sub-beam on the deflection grating in interference arm A from an optical axis through the detection unit $x_{2B}:=$the distance of the point of incidence of the sub-beam on the deflection grating in interference arm B from an optical axis through the detection unit $z_i:=$the distance of the splitting grating plane from the deflection grating plane $\alpha:=$the angle of incidence of the sub-beams on the splitting grating to the grating normal thereof $\lambda:=$the wavelength of the light source $k_{1A}:=1/d_{1A}$ (k vector of the splitting grating for interference arm A)

$k_{1B}:=1/d_{1B}$ (k vector of the splitting grating for interference arm B)

$n_{ref1}:=$the refractive index of the medium between the splitting grating and the deflection gratings Points of incidence $x_{3A}$, respectively $x_{3B}$ of the particular principal rays of the split sub-beams in the two interferometer arms A, B at combining grating 56 are derived from the following equation:

$$x_{3A/B} = \quad \text{(Equation 3)}$$
$$x_{2A/B} + z2\frac{(\sin\alpha + \lambda k_{1A/B} + \lambda k_{2A/B})}{n_{ref2}\sqrt{1-((\sin\alpha + \lambda k_{1A/B} + \lambda k_{2A/B})/n_{ref2})^2}}$$

$x_{3A}:=$the distance of the point of incidence of the sub-beam on the combining grating in interference arm A from an optical axis through the detection unit $x_{3B}:=$the distance of the point of incidence of the sub-beam on the combining grating in interference arm B from an optical axis through the detection unit $x_{2A}:=$the distance of the point of incidence of the sub-beam on the deflection grating in interference arm A from an optical axis through the detection unit $x_{2B}:=$the distance of the point of incidence of the sub-beam on the deflection grating in interference arm B from an optical axis through the detection unit $z_2:=$the distance of the deflection grating plane from the combining grating plane $\alpha:=$the angle of incidence of the sub-beams on the splitting grating to the grating normal thereof $\lambda:=$the wavelength of the light source $k_{1B}:=1/d_{1B}$ (k vector of the splitting grating for interference arm B)

$k_{2B}:=1/d_{2B}$ (k vector of the deflection grating for interference arm B)

$k_{1A}:=1/d_{1A}$ (k vector of the splitting grating for interference arm A)

$k_{2A}:=1/d_{2A}$ (k vector of the deflection grating for interference arm A)

$n_{ref2}:=$the refractive index of the medium between the deflection gratings and the combining grating Distance $z_2$ between the two deflection gratings 55.1, 55.2 and combining grating 56 is to be selected in this case in a way that allows points of incidence $x_{3A}$, respectively $x_{3B}$ on combining grating 56 to be the same for both sub-beams in interferometer arms A, B:

$$z_2 = z_1 \frac{x_{2A} - x_{2B}}{x_{3A} - x_{3B} - x_{2A} + x_{2B}} \quad \text{(Equation 4)}$$

where:

$z_2:=$the distance of the deflection grating plane from the combining grating plane $z_1:=$the distance of the splitting grating plane from the deflection grating plane $x_{3A}:=$the distance of the point of incidence of the sub-beam on the combining grating in interference arm A from an optical axis through the detection unit $x_{3B}:=$the distance of the point of incidence of the sub-beam on the combining grating in interference arm B from an optical axis through the detection unit $x_{2A}:=$the distance of the point of incidence of the sub-beam on the deflection grating in interference arm A from an optical axis through the detection unit $x_{2B}:=$the distance of the point of incidence of the sub-beam on the deflection grating in interference arm B from an optical axis through the detection unit The wavelength-dependent phase difference $\Delta p(\lambda)$ between the two interference arms is composed of the two geometric differences in path length and the two grating phase differences at deflection gratings 55.1, 55.2 and combining grating 56, as follows:

$$\Delta p(\lambda) = \quad \text{(Equation 5)}$$
$$x_{2A}(\lambda)k_{1A} - x_{2B}(\lambda)k_{1B} - \frac{z_1 n_{ref1}}{\lambda\sqrt{1-((\sin\alpha + \lambda k_{1A})/n_{ref1})^2}} +$$
$$\frac{z_1 n_{ref1}}{\lambda\sqrt{1-((\sin\alpha + \lambda k_{1B})/n_{ref1})^2}} + -x_{3A}(\lambda)k_3 -$$
$$x_{3B}(\lambda)k_3 + \frac{z_2 n_{ref2}}{\lambda\sqrt{1-((\sin\alpha + \lambda k_{1A} + \lambda k_{2A})/n_{ref2})^2}} -$$
$$\frac{z_2 n_{ref2}}{\lambda\sqrt{1-((\sin\alpha + \lambda k_{1B} + \lambda k_{2B})/n_{ref2})^2}}$$

where:

$\Delta p(\lambda):=$the wavelength-dependent phase difference $x_{3A}:=$the distance of the point of incidence of the sub-beam on the combining grating in interference arm A from an optical axis through the detection unit $x_{3B}:=$the distance of the point of incidence of the sub-beam on the combining grating in interference arm B from an optical axis through the detection unit $x_{2A}:=$the distance of the point of incidence of the sub-beam on the deflection grating in interference arm A from an optical axis through the detection unit $x_{2B}:=$the distance of the point of incidence of the sub-beam on the deflection grating in interference arm B from an optical axis through the detection unit $z_2$:=the distance of the deflection grating plane from the combining grating plane $z_1$:=the distance of the splitting grating plane from the deflection grating plane $\alpha$:=the angle of incidence of the sub-beams on the splitting grating to the grating normal thereof $\lambda$:=the wavelength of the light source $k_{1B}$:=1/$d_{1B}$ (k vector of the splitting grating for interference arm B)

$k_{2B}$:=1/$d_{2B}$ (k vector of the deflection grating for interference arm B)

$k_{1A}$:=1/$d_{1A}$ (k vector of the splitting grating for interference arm A)

$k_{2A}$:=1/$d_{2A}$ (k vector of the deflection grating for interference arm A)

$n_{ref1}$:=the refractive index of the medium between the splitting grating and the deflection gratings $n_{ref2}$:=the refractive index of the medium between the deflection gratings and the combining grating Phase difference $\Delta p(\lambda)$ as a function of wavelength has a nearly linear profile over a particular region. If it is integral, constructive interference results between the recombined sub-beams; if it is an uneven multiple of ½, then the result is destructive interference. The smallest difference between two wavelengths, at which constructive interference occurs, is to be referred to in the following as dispersion period $\Delta\lambda$. This should preferably correspond to scanning-side dispersion period $\Delta\lambda$ of the optical position-measuring device according to the present invention since, in this case, the entire spectrum is then automatically used for signal analysis. Distances $z_1$, $z_2$, as well as various grating constants $d_i$ of individual gratings 54, 55.1, 55.2, 56 are suited for specifically adjusting a suitable phase difference $\Delta p(\lambda)$.

When the condition from the above mentioned Equation 1 is met for grating constant $d_3$ of combining grating 56, then $0^{th}$ order of the one interference arm A is of the same direction as a $+2^{nd}$ order of the respective other interference arm B. Moreover, the $-1^{st}$ diffraction order of interferometer arm A is then of the same direction as the $+1^{st}$ diffraction order of interferometer arm B; in addition, the $-2^{nd}$ diffraction order of interferometer arm A is of the same direction as the $0^{th}$ diffraction order of interferometer arm B. On the detection side, the result is three channels in which the two sub-beams from interferometer arms A, B, having a different relative phase, interfere with one another and are converted by detector elements 53.1-53.3 into electrical signals, respectively scanning signals. Three 120° phase-shifted scanning signals are then usually present on the output side.

Ideally, the diffraction efficiencies of the $0^{th}$, $1^{st}$ and $2^{nd}$ diffraction orders of combining grating 56 are the same, and there is a 120° phase shift between the $0^{th}$ and the $2^{nd}$ diffraction orders. From the resulting phase difference between the $0^{th}$ and $2^{nd}$ diffraction orders, constructive interference for wavelengths $\lambda+/-\Delta\lambda/3$ with respect to the central signal path prevail in the corresponding signal paths, respectively channels. By using a lens downstream of combining grating 56 and placing detector elements 53.1, 53.2, 53.3 in the focal plane thereof, the three signal paths for the phase-shifted scanning signals may be spatially separate from one another without requiring much space.

In a modification of the first exemplary embodiment of the optical position-measuring device according to the present invention, instead of combining grating 56 and the plurality of individual detector elements 53.1-53.3, it may be provided to dispose a structured detector of a detector arrangement in detection unit 50 for the at least one deflection grating in the plane of the superposition location. This structured detector is composed of a multiplicity of periodically arrayed detector elements via which the phase-shifted scanning signals are recorded. The detector elements having a rectangular cross section, for example, are thereby disposed in close mutual proximity, and those detector elements, which record in-phase scanning signals, are electrically interconnected in each case. The periodicity of the detector elements, respectively distance $p_{struct}$ of those detector elements, which are each interconnected, is $$p_{struct} = \frac{1}{2k_3} \quad \text{(Equation 6)}$$

where:

$p_{struct}$:=the periodicity of the detector elements $k_3$:=1/$d_3$ (k vector of the combining grating)

Per period of the structured detector, three or four phase-shifted scanning signals may then be obtained from three or four detector elements. From these phase-shifted scanning signals, two 90° phase-shifted, direct component-free scanning signals may be generated in a generally known manner by forming linear combinations.

Figure 2:
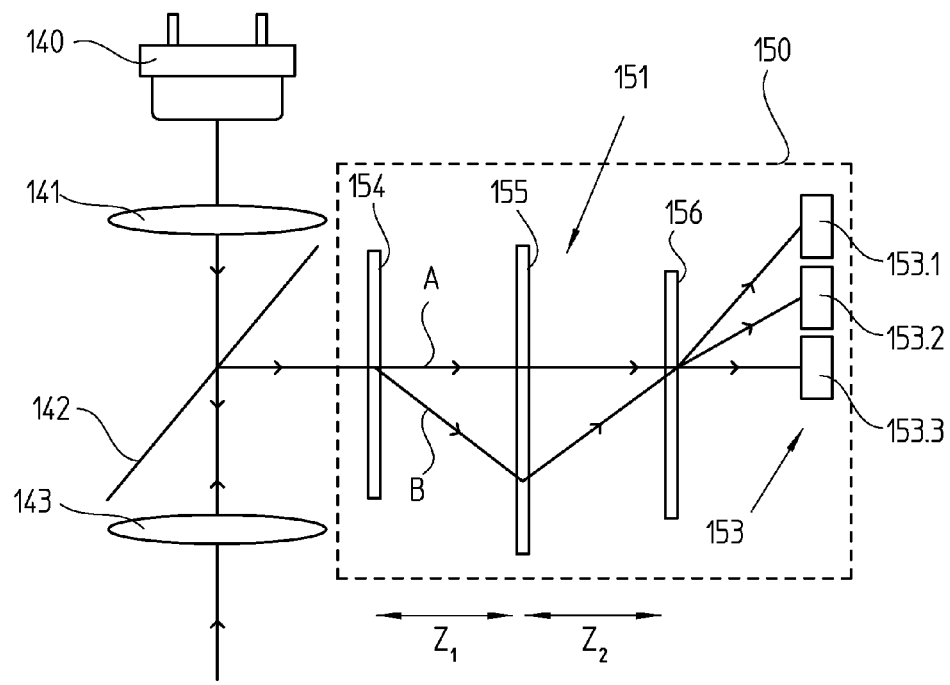
FIG. 2 is a schematized partial view of a first variant of the first exemplary embodiment of the optical position-measuring device according to the present invention.

A first variant of the first exemplary embodiment of the optical position-measuring device according to the present invention is shown in FIG. 2 in a partial view in schematic form. The following primarily clarifies the differences in the design of detection unit 150 from the first exemplary embodiment from FIG. 1.

It is thus provided at this point that the sub-beams reflected back from the material measure via lens 143 and beam splitter 142, strike splitting grating 154 in detection unit 150 by angle of incidence $\alpha=0°$ to grating normal GN, thus impinge perpendicularly on the splitting grating. In addition, it holds here that $k_{1B}=0$, $k_{2B}=0$, as well as $n_{ref1}=n_{ref2}=n_{ref}$. From this is derived, in turn, that $z_1=z_2$, $k_{2A}=2k_{1A}$ and $k_3=\frac{1}{2}k_{1A}$. With regard to the meaning of these variables, reference is made to the definitions in the above equations.

Thus, in this variant of the optical position-measuring device according to the present invention, it follows from above mentioned Equation 5 for wavelength-dependent phase shift $\Delta p(\lambda)$:

$$\Delta p(\lambda) = 2n_{ref}\frac{z_1}{\lambda}\left[1 - \frac{1-\left(\frac{\lambda k}{n_{ref}}\right)^2}{\sqrt{1-\left(\frac{\lambda k}{n_{ref}}\right)^2}}\right] \quad \text{(Equation 7)}$$

where:

$\Delta p(\lambda)$:=the wavelength-dependent phase difference $n_{ref}$:=the refractive index of the materials between the splitting grating, the deflection grating, and the combining grating $z_1$:=the distance of the splitting grating plane from the deflection grating plane $\lambda$:=the wavelength of the light source $k$:=1/$d_1$ (vector of the splitting grating)

The following approximation holds for various gratings 154, 155, 156 with respect to the grating constants thereof that are not too fine, $$\Delta p(\lambda) \approx z_1 \frac{\lambda k^2}{n_{ref}} \quad \text{(Equation 8)}$$

where:

$\Delta p(\lambda)$:=the wavelength-dependent phase difference $n_{ref}$:=the refractive index of the materials between the splitting grating, the deflection grating, and the combining grating $z_1$:=the distance of the splittting grating plane from the deflection grating plane $\lambda$:=the wavelength of the light source $k$:=$1/d_1$ (k vector of the splitting grating)

If the grating constant is small enough, in this variant, deflection grating 155 may be optimized as a binary grating to feature a high diffraction efficiency >70% in the +/−$1^{st}$ order in the case of illumination at the Littrow angle and, at the same time, feature a high efficiency >70% in the $0^{th}$ order in the case of a perpendicular illumination. Littrow angle is understood here to be that angle of incidence at which the resulting diffraction angle of the diffractively reflected sub-beam is identical to the angle of incidence, but has an inverted sign. In this way, the desired beam characteristic becomes very efficient, even without complete separation of the two diffraction orders; at the same time, undesired diffraction orders are heavily suppressed. Since there is no need for the diffraction orders to be spatially separate from one another here, an extremely compact design of detection unit 150 of the optical position-measuring device according to the present invention is possible.

The following also indicates the dimensioning parameters of a specific exemplary embodiment of this variant of the optical position-measuring device according to the present invention that features a dispersion period of $\Delta\lambda=30$ nm; in addition, a refractive index of $n_{ref}=1.5$ is assumed, as is a central wavelength of $\lambda=0.85$ μm and a grating constant of splitting grating 154 of 2 μm, thus a corresponding k vector $k_{1A}=0.5$ μm$^{-1}$. On the basis of Equation 7, from this is derived for distances $z_1$, $z_2$:$z_1=z_2=188$ μm.

By ascertaining the phase differences for the divergence angle range of the beam incident on the splitting grating and by integrating the signals accordingly, Equation 5 also makes it possible to estimate the extent to which the beam divergence influences the signal. At an angle of incidence of a $\alpha=2°$ (due to an unavoidable divergence of this beam), a phase difference of 8° is derived for the mentioned dimensioning example. At a divergence angle range of ±2°, a degree of modulation of 90% is reached. To reach an appropriate divergence using an optical fiber having a core diameter of 400 μm, for example, a focal length of lens 143 of only 5.7 mm is necessary. To achieve the appropriate wavelength resolution of 10 nm using one or, in some instances, two splitting means configured as diffraction gratings in accordance with the related art from the European Patent Application EP 2 765 394 A2 having an 800 nm period, a lens 143 having a focal length of 27 mm, respectively 13.5 mm would be required given the same diameter of the optical fiber. Thus, the approach of an embodiment of the present invention provides a way to significantly reduce the installation space required for detection unit 150.

Figure 3:
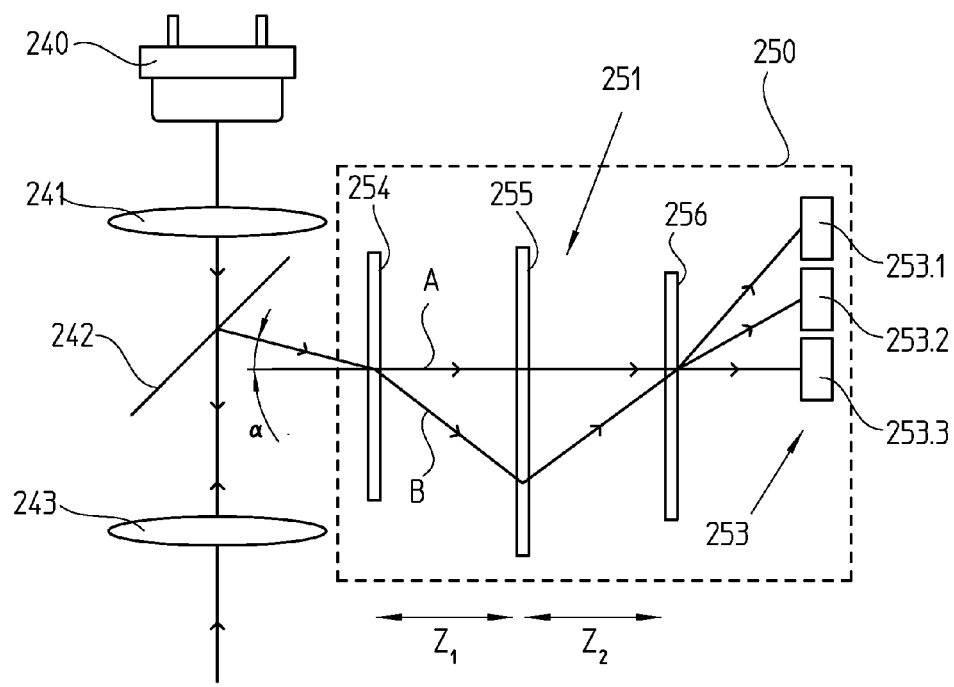
FIG. 3 is a schematized partial view of a second variant of the first exemplary embodiment of the optical position-measuring device according to the present invention.

Another, second variant of the first specific embodiment of the optical position-measuring device according to the present invention is shown in FIG. 3, analogously to the view of FIG. 2, in a partial view in schematic form. On the other hand, only the relevant differences from the first exemplary embodiment from FIG. 1 will be described in the following.

For the angle of incidence a, it holds here that $\sin(\alpha)=\lambda k_{1B}$; it is also provided that $k_{1B}=-k_{1A}=\frac{1}{4}k_{2A}$, $k_{2B}=0$ and $n_{ref1}=n_{ref2}=n_{ref}$.

From this is derived, in turn, that $z_1=z_2$ and $k_3=k_{1A}$. The resulting beam path substantially resembles that of the variant described above. In comparison to the variant mentioned above, splitting grating 254 has half of the grating constant and is illuminated in such a way that, in response to illumination with the central wavelength, one of the two $1^{st}$ diffraction orders continues to propagate perpendicularly to the grating plane. Splitting grating 254 is to be designed in a way that preferably suppresses the $0^{th}$ diffraction order. The advantage over the previous variant is that there is no need to design splitting grating 254 as a blazed grating; rather, it may be configured as a two-stage, deeply etched grating, for example, that is simpler to manufacture.

Figure 4:
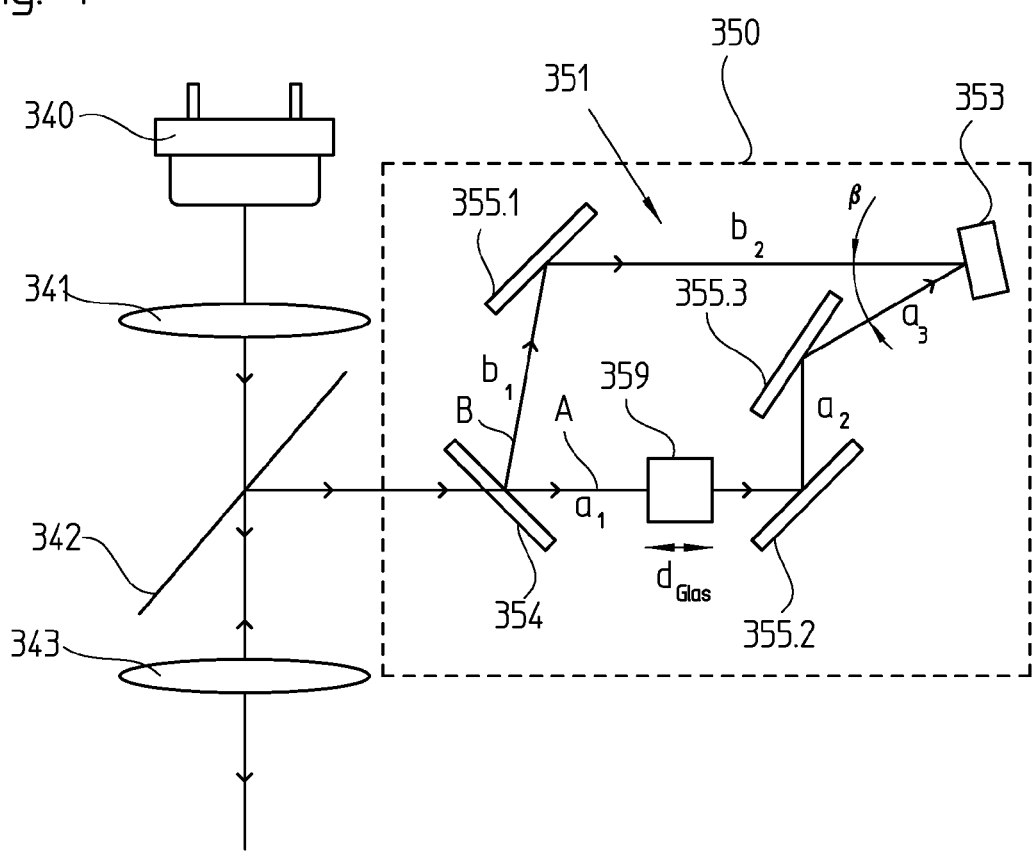
FIG. 4 is a schematized partial view of a second exemplary embodiment of the optical position-measuring device according to the present invention.

Finally, a second exemplary embodiment of the optical position-measuring device according to the present invention is described with reference to FIG. 4, which essentially shows the embodiment of detection unit 350, again in a schematic view.

At this point, the asymmetrical interferometer provided in detection unit 350 is configured as a mirror interferometer, which includes a splitting grating 354, as well as a plurality of downstream deflection mirrors 355.1-355.3. At splitting grating 354, the incident sub-beams are then split between the two interferometer arms A, B; the split sub-beams then propagate toward deflection mirrors 355.1, respectively 355.2, 355.3, that are placed in the two interferometer arms A, B and that deflect the sub-beams in a way that causes them to arrive at a superposition location for purposes of recombination.

To obtain desired dispersion period $\Delta\lambda$, it is necessary to adjust a path length difference $\Delta x$ between the two interferometer arms A, B. For this, the following Equation 9 applies:

$$\Delta x = a_1 + a_2 + a_3 - b_1 - b_2 = \frac{\lambda^2}{\Delta\lambda} \quad \text{(Equation 9)}$$

where:

$\Delta x$:=the path length difference between the two interferometer arms $a_1$:=the distance of the splitting grating to the first deflection mirror in interferometer arm A $a_2$:=the distance of the first deflection mirror to the second deflection mirror in interferometer arm A $a_3$:=the distance of the second deflection mirror to the superposition location in interferometer arm A $b_1$:=the distance of the splitting grating to the first deflection mirror in interferometer arm B $b_2$:=the distance of the first deflection mirror to the superposition location in interferometer arm B $\lambda$:=the wavelength of the light source Path difference, respectively path length difference $\Delta x$ may also be adjusted by introducing a plane-parallel glass plate 359 having defined thickness $d_{glass}$ and refractive index $n_{ref}$ into one of two interferometer arms A, B, respectively sub-beams, as provided in the illustrated exemplary embodiment. It holds accordingly then for path difference $\Delta x$ that:

$$\Delta x = a_1 + a_2 + a_3 + d_{Glas}(n_{ref}-1) - b_1 - b_2 = \frac{\lambda^2}{\Delta\lambda} \quad \text{(Equation 10)}$$

where:

Δx:=the path length difference between the two interferometer arms $a_1$:=the distance of the splitting grating to the first deflection mirror in interferometer arm A $a_2$:=the distance of the first deflection mirror to the second deflection mirror in interferometer arm A $a_3$:=the distance of the second deflection mirror to the superposition location in interferometer arm A $b_1$:=the distance of the splitting grating to the first deflection mirror in interferometer arm B $b_2$:=the distance of the first deflection mirror to the superposition location in interferometer arm B λ:=the wavelength of the light source $d_{glass}$:=the thickness of the glass plate $n_{ref}$:=the refractive index of the glass plate In this exemplary embodiment, a detector arrangement 353 in the form of a structured detector, which is composed of a multiplicity of periodically arrayed detector elements, via which the phase-shifted scanning signals are recorded, is disposed at the superposition location where the sub-beams from the two interferometer arms A, B recombine at angle β. The beam path in the two interferometer arms A, B is directed here over different deflection mirrors 355.1-355.3 in a way that allows a normal to the structured detector of detector arrangement 353 to constitute the bisectrix between the two sub-beams that are incident thereon. An interference fringe pattern having periodicity λ/sin(β) then results in the detection plane, respectively on the structured detector. The periodicity of the structured detector is to be selected accordingly.

Besides the specifically described exemplary embodiments, respectively corresponding variants of the optical position-measuring device according to the present invention, it is self-evident that other embodiments are also possible within the scope of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device, comprising:
   a scanning unit;
   a reflective material measure that is movable relative to the scanning unit in at least one measuring direction, wherein the optical position-measuring device is configured to generate a plurality of phase-shifted scanning signals indicative of a relative position of the scanning unit and of the material measure from superimposed sub-beams generated by interaction of the scanning unit and the material measure, wherein phase relations of the generated phase-shifted scanning signals are wavelength-dependent; and
   a detection unit including a splitting device and an optoelectronic detector arrangement, the splitting device being configured to separate the superimposed sub-beams incident thereon as a function of wavelength, the splitting device being configured as an asymmetrical interferometer that includes two interferometer arms having different optical path lengths, within which the sub-beams propagate between splitting and recombination until the recombined sub-beams arrive at the optoelectronic detector arrangement.

2. The optical position-measuring device as recited in claim 1, wherein the optical path lengths in the two interferometer arms allow same phase shifts to result per wavelength variation on a detection side and a scanning side.

3. The optical position-measuring device as recited in claim 1, wherein the asymmetrical interferometer is configured as a grating interferometer and includes a splitting grating and at least one downstream deflection grating, wherein, at the splitting grating, the sub-beams incident thereon are split between the two interferometer arms and then propagate in a direction of the at least one deflection grating that re-deflects the sub-beams in a way that allows the sub-beams to arrive at a superposition location for recombination.

4. The optical position-measuring device as recited in claim 3, wherein the splitting grating is configured as a blazed grating or as a two-stage, etched grating that causes the sub-beams incident thereon to be split into different diffraction orders.

5. The optical position-measuring device as recited in claim 4, wherein the splitting grating has two different grating constants, for each of which diffraction orders having a high diffraction efficiency result.

6. The optical position-measuring device as recited in claim 3, wherein the at least one deflection grating of the grating interferometer includes one or more deflection gratings having at least two different grating constants, wherein different deflection grating regions on the one or more deflection gratings have different grating constants that are associated with the two interferometer arms.

7. The optical position-measuring device as recited in claim 3, further comprising a combining grating disposed at the superposition location, and a plurality of detector elements of the detector arrangement disposed downstream of the combining grating and configured to record the phase-shifted scanning signals.

8. The optical position-measuring device as recited in claim 3, wherein a structured detector of the detector arrangement is disposed at the superposition location and includes a plurality of periodically arrayed detector elements via which the phase-shifted scanning signals are recordable.

9. The optical position-measuring device as recited in claim 3, wherein the asymmetrical interferometer is configured such that the sub-beams are perpendicularly incident to the splitting grating, and wherein the at least one grating interferometer includes at least one deflection grating that is configured as a binary grating that:

in response to an illumination at the Littrow angle, provides a diffraction efficiency >70% in +/−$1^{st}$ diffraction order; and in response to a perpendicular illumination, provides a diffraction efficiency of >70% in $0^{th}$ diffraction order.

10. The optical position-measuring device as recited in claim 3, wherein the asymmetrical interferometer is configured such that the sub-beams are incident to the splitting grating at an angle that deviates from 90°, the angle being of a magnitude that allows one of the $1^{st}$ diffraction orders resulting at the splitting grating to continue to propagate perpendicularly to the splitting grating, and wherein the splitting grating is configured as a two-stage, deeply etched grating that suppresses the $0^{th}$ diffraction order.

11. The optical position-measuring device as recited in claim 1, wherein the asymmetrical interferometer is configured as a mirror interferometer and includes a splitting grating and a plurality of downstream deflection mirrors, wherein, at the splitting grating, the sub-beams incident thereon are split between the two interferometer arms and then propagate in a direction of the deflection mirrors that re-deflect the sub-beams in a way that causes the sub-beams to arrive at a superposition location for recombination.

12. The optical position-measuring device as recited in claim 11, wherein a plane-parallel glass plate of a defined thickness is disposed in an optical path of one of the sub-beams so as to provide a desired path difference in at least one of the interferometer arms.

13. The optical position-measuring device as recited in claim 11, wherein a structured detector of the detector arrangement is disposed at the superposition location and includes a plurality of periodically arrayed detector elements via which the phase-shifted scanning signals are recordable, and wherein at least one of a beam path in the two interferometer arms and an orientation of the structured detector allows a normal to the structured detector to constitute a bisectrix between the two sub-beams that are incident thereon.

14. The optical position-measuring device as recited in claim 1, wherein the scanning unit includes a fiber-optic scanning head having a scanning reticle disposed therein upstream of a material measure-side end of an optical fiber, and wherein the splitting device, the detector arrangement and at least one light source are disposed at an end of the optical fiber facing away from the material measure.

15. A method for generating a plurality of phase-shifted scanning signals indicative of a relative position of a scanning unit and of a material measure that is movable relative to the scanning unit in at least one measuring direction, wherein phase relations of the generated phase-shifted scanning signals are wavelength-dependent, the method comprising:

Separating superimposed sub-beams as a function of wavelength using a splitting device configured as an asymmetrical interferometer that includes two interferometer arms having different optical path lengths, such that the sub-beams propagate within the asymmetrical interferometer between splitting and recombination until the recombined sub-beams arrive at an optoelectronic detector arrangement.

* * * * *